United States Patent [19]
Gremaud et al.

[11] Patent Number: 5,004,930
[45] Date of Patent: Apr. 2, 1991

[54] METHOD AND DEVICE FOR SETTING THE ANGULAR POSITION OF A WORKPIECE ON A MACHINE-TOOL BY MEANS OF A LASER BEAM

[75] Inventors: Henri Gremaud; Martial Gremaud; Michel Rollier, all of Le Landeron, Switzerland

[73] Assignee: Francis Rollier SA, La Neuyeville, Switzerland

[21] Appl. No.: 455,990

[22] Filed: Dec. 21, 1989

[30] Foreign Application Priority Data

Dec. 21, 1988 [CH] Switzerland ............... 04727/88

[51] Int. Cl.$^5$ ............................................. G01N 21/86
[52] U.S. Cl. ..................................... 250/561; 356/387
[58] Field of Search ............... 250/561; 356/376, 384, 356/387

[56] References Cited
U.S. PATENT DOCUMENTS

| | | |
|---|---|---|
| 3,900,738 | 8/1975 | McKay, Sr. .................. 250/561 |
| 4,340,326 | 7/1982 | Buonauro et al. ............ 250/561 |
| 4,521,112 | 6/1985 | Kuwabara et al. ........... 356/387 |
| 4,747,911 | 5/1988 | Polson .......................... 356/387 |

*Primary Examiner*—David C. Nelms
*Attorney, Agent, or Firm*—McGlew and Tuttle

[57] ABSTRACT

The invention concerns a method of precisely setting a workpiece (3) having a non-circular contour in a predetermined angular position. The workpiece (3) is placed in the path of a mobile laser beam (F) produced by a laser generator (10) and sweeping an area (P) in which the workpiece produces a shaded zone (Z) whose width (L) depends on the orientation of the workpiece. The width (L) is measured by a laser receiver (11) and the workpiece is turned until the measured width reaches a reference value (L1) when the workpiece is in the desired predetermined position. This method is advantageously used for angularly positioning, with a precision of about a 6 minute arc, a roughly-cut drill bit in a grinding machine for sharpening its tip.

10 Claims, 2 Drawing Sheets

METHOD AND DEVICE FOR SETTING THE ANGULAR POSITION OF A WORKPIECE ON A MACHINE-TOOL BY MEANS OF A LASER BEAM

BACKGROUND OF THE INVENTION

The present invention relates to a method of positioning a workpiece, for example a roughly-cut drill bit, in a predetermined angular position in a machine-tool. It also relates to a device or apparatus for carrying out this method.

Taking a drill bit as an example, the production method consists firstly in producing a roughly-cut drill bit which is finished except for its end or tip which is left in an unfinished state. This tip is then machined in a grinding machine to a conical shape with cutting edges defined by the intersection of two surfaces.

The roughly-cut drill bit, whose diameter is equal to the nominal diameter of the finished drill bit, includes helicoidal or straight flutes for removing chips, the edges of these flutes forming one of the surfaces of the finished cutting edges.

The purpose of sharpening is to shape the other surface of each cutting edge. This is a delicate operation that must precisely be carried out because the angle made by this surface with the other surface of the cutting edge directly influences the quality of the drill bit. It is therefore essential to place the roughly-cut drill bit on the machine in a well determined angular position in order to exactly know the position of the flutes relative to the grinding wheel. This then enables machining of the tip in such a manner that the angle between the two surfaces defining the cutting edges has the desired value.

Angular positioning of the flutes of a roughly-cut drill bit has heretofore been obtained by methods consisting, for example, in bringing the side of a flute into contact with a mechanical sensor. Or, as described in detail in Swiss patent 659 790, a roughly-cut drill bit is placed in a flux of parallel light rays from a lamp, then the intensity of the flux intercepted by the drill bit is measured by means of a photosensitive device, the measured intensity being representative of the angular position of the flutes.

The method employing a sensor has the disadvantage that it necessarily involves a delicate mechanical device of limited precision.

With the optical method disclosed in the citation, only the maximum value of the strength of the intercepted light flux gives a well defined angular position of the flutes of the roughly-cut drill bit. In theory, this maximum is clearly marked, but in practice because of non-parallelism of the light rays and defective symmetry of the roughly-cut drill bit, the maximum is relatively flat and therefore difficult to localize. This difficulty, which limits the positioning precision to about 30 minutes of an arc, is the main drawback of this method.

SUMMARY OF THE INVENTION

The main object of the invention is to provide an optical positioning method that does not have these drawbacks.

To achieve this object, the method according to the invention of angularly setting a workpiece that is rotatably mounted about an axis of a machine-tool and wherein the position of the workpiece is defined by an angle, in a predetermined position corresponding to a given angle, is characterized in that it consists in:

sweeping with a mobile laser beam an area passing through at least a part of the workpiece in such a manner that said part, by intercepting the beam, produces in said area a shaded zone defined by a characteristic quantity varying with said angle, said quantity taking a reference value at said given angle;

measuring the characteristic quantity;

turning the workpiece about the axis until the characteristic quantity reaches the reference value, whereupon the workpiece is in the predetermined position; and stopping the workpiece in said predetermined position.

An advantage of the method according to the invention is that a very great precision in the angular positioning can be achieved, to about 6 minutes of an arc.

Another object of the invention is to provide a device for precise angular positioning, for carrying out the method according to the invention.

BRIEF DESCRIPTION OF DRAWINGS

Further characteristics and advantages of the invention will be apparent from the following description, with reference to the accompanying drawings, of a nonlimiting example of a method of angularly positioning a roughly-cut drill bit in a grinding machine. In the drawings, where the same reference numerals refer to similar parts.

DETAILED DESCRIPTION

The present invention will be described taking as example the machining, by grinding or sharpening, of the end, also referred to as the tip, of a roughly-cut drill bit. The purpose of this operation is to form the cutting edges and provide the tip with a conical shape. This is an important operation that must be carried out with care because the quality and performance of the drill bit depend essentially on the machining.

Figure 1:
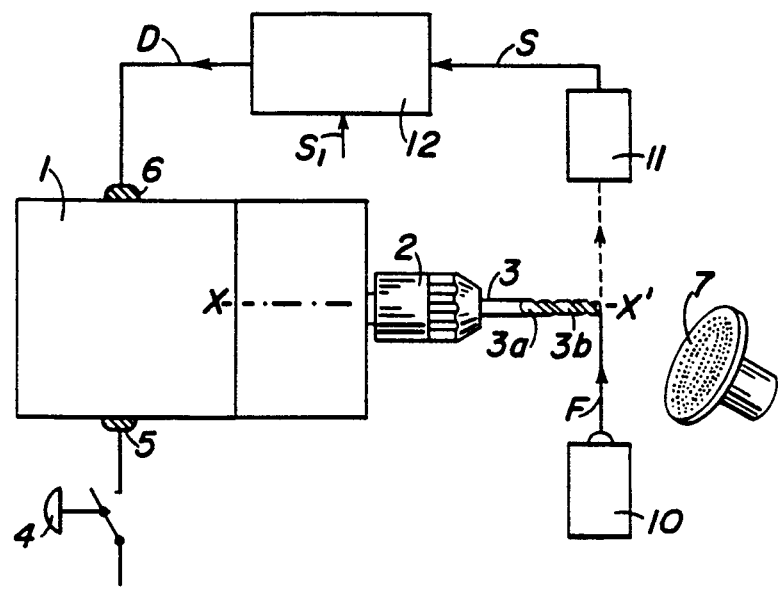
FIG. 1 is a diagrammatic view of a drill bit fixed in a grinding machine and an embodiment of the laser beam angular positioning device according to the invention.

FIG. 1 diagrammatically shows equipment for sharpening a drill bit. In this Figure, reference 1 designates the headstock of a grinding machine. Headstock 1 is fixed on a frame, not shown, and comprises a mandrel 2 rotatable about an axis xx'. Gripped in the mandrel 2 is a roughly-cut drill bit 3 of steel or hard sintered metal to be machined. This drill bit 3, like the mandrel 2, is thus rotatable about the axis xx'. The mandrel 2 can be rotated by a motor (not shown) located in headstock 1, in response to a signal, for example produced by actuating a control button 4, delivered to an "on" terminal 5. Rotation of the mandrel is stopped in the same manner by delivering a signal to a "stop" terminal 6. The tip of drill bit 3 is sharpened by means of a grinding wheel 7 able to move in a well defined manner relative to the machine's frame.

As already mentioned, the roughly-cut drill bit 3 comprises several flutes. In the illustrated example, there are two helicoidal flutes designated respectively by 3a and 3b. The end of this drill bit 3 is arranged in the path of a thin mobile laser beam F so as to intercept this beam. Beam F is produced by a laser generator 10, preferably of the semi-conductor type. The beam F is propagated parallel to itself in a plane perpendicular to the axis xx' and is detected by a laser receiver 11. This receiver 11 supplies a signal S representative of a characteristic quantity produced by the beam intercepted by the drill bit 3, this quantity depending on the angular position of the flutes 3a and 3b. Signal S is compared with a reference signal S1 in a comparator circuit 12 of known type, signal S1 corresponding to a predetermined angular position of the drill bit 3. When signal S reaches value S1, comparator 12 produces a signal D that is delivered to the terminal 6 of the grinding machine.

Operation of the equipment is as follows. When the roughly-cut drill bit 3 has been secured in the mandrel 2, the drill bit 3 is made to rotate about axis xx' by pressing on control button 4. The rotation produces a variation of signal S and, as soon as signal S equals S1, the comparator 12 produces signal D. This signal D, supplied to terminal 6, then stops rotation of drill bit 3 in the position corresponding to the predetermined angular position.

The tip of the roughly-cut drill bit 3 can then be machined by means of the grinding wheel 7 in known manner.

The device formed of elements 10, 11 and 12 that enables the drill bit 3 to be placed in a given angular position in the machine-tool will now be described in greater detail with reference to FIGS. 2 and 3.

Figure 2:
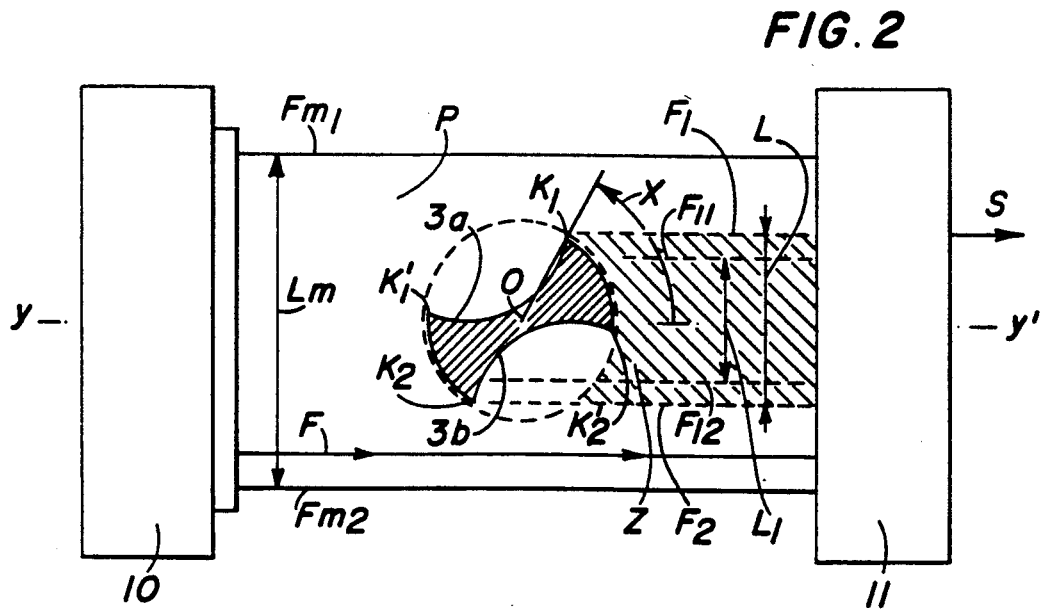
FIG. 2 is an end view of a drill bit disposed in the area swept by the laser beam.
Figure 3A:
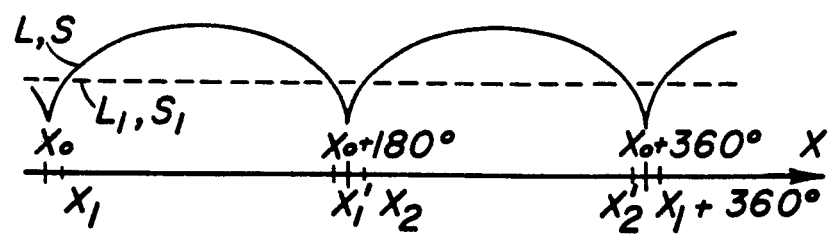
FIG. 3 is a diagram illustrating the main signals produced at different points of the circuit of the device of FIG. 1.
Figure 3B:
Figure 3C:
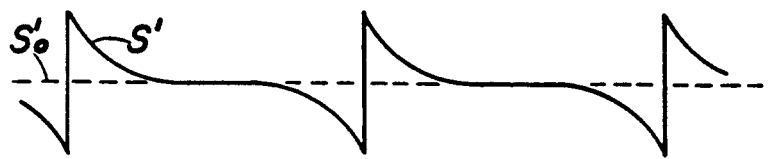
Figure 3D:
Figure 3E:

FIG. 2 shows the laser generator 10, the laser receiver 11 and the drill bit 3 in end view. Generator 10 produces the beam F of perfectly parallel laser rays. This beam F moves in a plane perpendicular to axis xx', parallel to an axis yy' in this plane. The axes xx' and yy' intersect at a point 0, at the cross-sectional center of the drill bit 3 in the plane containing beam F. The beam F moves between two extreme positions Fm1 and Fm2 separated by a distance Lm greater than the diameter of the drill tip.

The beam F thus sweeps an area P that intersects the end of drill bit 3. Area P is rectangular, its width being equal to Lm and its length equal to the distance between the generator 10 and receiver 11. In section, the drill bit 3, which is situated substantially at the center of area P, has two pairs of angulated points K1, K1' and K2, K2'. These pairs of points are defined by the intersection of the surface defining the contour of the drill bit 3 with the surfaces defining flute 3a and flute 3b, respectively. Because the section of drill bit 3 is symmetrical relative to center 0, the points K1 and K2 are diametrally opposed and, in the illustrated example, are located on the diameter defining the drill bit's diameter. However, the points K1' and K2', which are also diametrally opposed are separated by a distance less than the distance between the former points. Machining of the drill bit's tip must be done so that the cutting edges pass through points K1 and K2. It is therefore essential to precisely know the position of these points, which position is given for example by the angle X made by the straight line OK1 with axis Oy'.

Because the tip of drill bit 3 extends through the area P it produces therein a shaded zone Z. This zone is situated between two beams F1 and F2 passing respectively through points K1 and K2 in the case illustrated in FIG. 2. The beams F1 and F2 are separated by a distance equal to the width L of shaded zone Z. This width L varies with angle X and corresponds to the aforementioned characteristic quantity. Finally, the receiver 11 which receives the beam F and supplies signal S is arranged in such a manner that signal S is representative of the width L. In the following description, it will be assumed that S is proportional to L.

Of course, the area P could pass through only a part of drill bit 3, for example the part situated above axis yy'. In this case, the width of the shaded zone would be given by the distance between beam F1 and axis yy'.

The laser generator 10 and receiver 11 will not be described in detail because they are well known measuring apparatus, for example the commercially-available apparatus produced by Messrs KEYENCE of Osaka, Japan. Such apparatus enable rapid measurement, to a precision of about one micrometer, of a length such as the diameter of circular pieces. To do this, the piece is placed in the area swept by the laser beam, and the signal S produced directly indicates the measured value of the diameter, for example on a digital display.

A typical curve showing the variation of L, or S which is proportional thereto, as a function of X is shown as curve a) in FIG. 3 for a drill bit having two flutes. This curve passes through very pointed minima, theoretically turning points at angles $X = Xo + n.180°$ ($n = 0, 1, 2, \ldots$), and rather flat maxima between the consecutive minima.

The minimum value of L could serve to define a predetermined angular position of the drill bit 3. However, any defective symmetry of the roughly-cut drill bit producing an inequality of the arcs K1, K2' and K2, K1' would result in a flattening of the minima of L and considerably reduce the precision of positioning, like in the cited document.

It is therefore preferable to choose as predetermined angular position of the drill bit 3 an arbitrary angular position corresponding to a given angle X1 for which the width L is equal to a reference width L1, the corresponding value of signal S being the reference value S1. The width L1 defines a shaded zone defined between two beams, designated by F11 and F12, passing respectively through points K1 and K2 when drill bit 3 is in angular position X1.

Positioning of drill bit 3 in the angular position X1 is obtained, as previously described, by means of a comparator circuit 12 shown in FIG. 1. This circuit, of known type, receives signals S1 and S2 and delivers output signal D, shown as curve b) in FIG. 3. Signal D is in the logic low state as long as S is different from S1 and high when S is equal to S1.

Signal D is delivered to terminal 6 while drill bit 3 is turned by the motor, the motor stopping immediately the signal D goes high, i.e. when $X = X1$. This stopping places places drill bit 3 in the predetermined position for which $L = L1$ and $S = S1$. The positioning will be all the more precise when it takes place at a point where L varies rapidly as a function of X, i.e. near Xo in this instance.

The condition $L = L1$ (or $S = S1$) however does not define solely the angle X1, but also the angles X1', X2 and X2', as illustrated in FIG. 3, when the drill bit 3 makes one complete rotation starting from Xo. Given that angle X1 corresponds to the predetermined position, angle X2 is the angle at which drill bit 3 has rotated through 180° so that beams F11 and F12 pass respectively through K2 and K1. For angle X1', these beams pass respectively through K2' and K1', and for angle X2' through K1' and K2'.

Machining of the tip of drill bit 3 must only take place when the drill bit 3 is located in the angular positions defined by X1 and X2. Machining must not take place at positions X1' and X2'. Now, the device as described so far makes no distinction between these angular positions and would stop turning the drill bit 3 at the first of these positions that is encountered, this position depending on the angular starting position.

Figure 4:
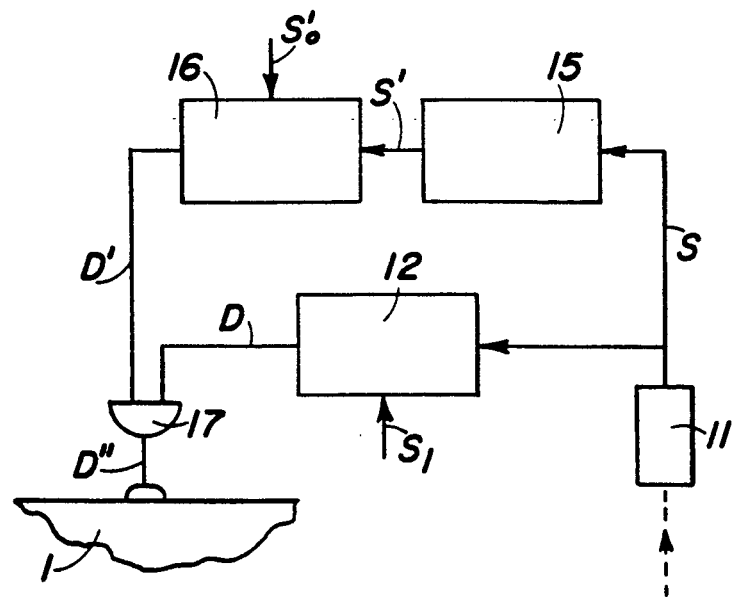
FIG. 4 shows another embodiment of the circuit of the positioning device.

A selective positioning device, which avoids stopping drill bit 3 in positions corresponding to angles X1' and X2', is illustrated in FIG. 4. This device comprises, in addition to the previously described comparator circuit 12, a discriminator circuit 15, a second comparator circuit 16 and a two-input AND gate 17.

Circuit 15 receives at its input the signal S and supplies an output signal S', shown as curve c) in FIG. 3, whose amplitude is a measurement of the slope of the tangent of curve a) representing signal S as a function of X.

At angles X1 and X2 signal S is increasing and signal S' is positive, whereas at angles X1' and X2' signal S is decreasing and S' is negative. The sign of signal S' therefore enables a discrimination between those angles of the roughly-cut drill bit suitable for sharpening and the angles that must not be sharpened.

For this purpose, the signal S' is delivered to comparator circuit 16 which also receives a reference signal designated by So'. In the case under consideration, So' is equal to zero. The output of circuit 16 delivers a logic signal D', shown as curve d) in FIG. 3, that is high when S' is greater than So' and low when S' is less than or equal to So'. This circuit will not be described as it is well known to persons skilled in the art. Angles X1 and X2 are thus enclosed within the high parts of signal D', and angles X1' and X2' are enclosed within the low parts of signal D'.

Lastly, one input of gate 17 receives the signal D produced by comparator 12 and the other input receives signal D', the output of gate 17 delivering a signal D" to the motor's stop terminal 6. The two inputs of gate are simultaneously high along therefore with signal D", only for angles X1 and X2.

Since signal D" is delivered to terminal 6, the device illustrated in FIG. 4 will only stop the drill bit 3 in the predetermined position corresponding to angle Xl, or in the symmetrical and equivalent position corresponding to angle X2, regardless of the starting angular position of drill bit 3.

In the described positioning device, the signals S, S', S1, So' and circuits 12, 15 and 16 are of the analog type, but these signals and circuits could also be digital.

Of course, the present invention is not limited to the illustrated embodiment, but the scope of the patent extends also to modifications that can be regarded as equivalents of all or part of the described arrangements.

We claim:

1. A method of angularly setting a workpiece (3) that is rotatably mounted about an axis (xx') of a machine-tool and wherein the position of the workpiece is defined by an angle (X), in a predetermined position corresponding to a given angle (Xl), said method comprising:

sweeping with a mobile laser beam (F) an area (P) passing through at least a part of the workpiece (3) in such a manner that said part, by intercepting said beam, produces in said area a shaded zone (Z) defined by a characteristic quantity (L) varying with said angle (X), said quantity taking a reference value (L1) at said given angle (Xl):

measuring said characteristic quantity (L);

turning said workpiece (3) about said axis (xx') until the characteristic quantity (L) reaches said reference value (L1), which corresponds to the workpiece being in said predetermined position; and stopping the workpiece (3) in said predetermined position.

2. A method according to claim 1, wherein said area (P) is planar and is arranged perpendicular to said axis (xx').

3. A method according to claim 2, wherein said beam moves parallel to a fixed direction (yy') and said characteristic quantity (L) is the width of said shaded zone (Z) measured perpendicular to said direction.

4. A method according to claim 1, wherein said area (P) passes entirely through said workpiece (3).

5. A method according to claim 1, wherein said area (P) passes through at least a part of said workpiece adjacent to a location thereof to be machined.

6. A method according to claim 1, wherein said machine-tool comprises a grinding wheel (7) for sharpening said workpiece.

7. A method according to claim 1, wherein said workpiece (3) is a cutting tool having an axis of revolution.

8. A method according to claim 7, wherein said cutting tool is made of hard sintered metal.

9. An angular positioning device for carrying out the method according to claim 1 of angularly setting a workpiece (3) rotatably mounted about an axis (xx') of a machine-tool wherein the position of the workpiece is defined by an angle (X), in a predetermined position corresponding to a given angle (Xl), the device comprising:

means (10) for producing a mobile laser beam (F) sweeping an area (P) passing through at least part of said workpiece (3) in such a manner that said part, by intercepting the beam, produces in said area a shaded zone (Z) defined by a characteristic quantity (L) varying with said angle (X),:

means (11) for measuring said characteristic quantity (L) and supplying a measurement signal (S) representing said quantity, said signal taking a reference value (S1) for said given angle (X1);

means (12) for comparing said measurement signal (S) with said reference value (S1) and supplying a comparison signal (D) when the measurement signal is equal to the reference signal;

means (4,5) for rotating said workpiece (3) about said axis (xx'); and means (6) for stopping rotation of the workpiece (3) in response to the comparison signal (D) when the workpiece is in said predetermined angular position.

10. A device according to claim 9, further comprising means (15,16,17) for selecting from several angular positions of said workpiece (3) for which said measurement signal (S) takes said reference value (S1), the position corresponding to said predetermined angular position.

* * * * *